United States Patent
Tang (10) Patent No.: US 9,407,189 B2
(45) Date of Patent: Aug. 2, 2016

(54) DIRECT TORQUE CONTROL MOTOR CONTROLLER WITH TORQUE RIPPLE REDUCTION

(71) Applicant: Atieva, Inc., Redwood City, CA (US)

(72) Inventor: Yifan Tang, Los Altos, CA (US)

(73) Assignee: Atieva, Inc., Menlo Park, CA (US)

( * ) Notice: Subject to any disclaimer, the term of this patent is extended or adjusted under 35 U.S.C. 154(b) by 142 days.

(21) Appl. No.: 14/332,433

(22) Filed: Jul. 16, 2014

(65) Prior Publication Data

US 2016/0020717 A1    Jan. 21, 2016

(51) Int. Cl.
*H02P 6/16* (2016.01)
*H02P 6/10* (2006.01)
*H02P 21/05* (2006.01)

(52) U.S. Cl.
CPC  *H02P 21/30* (2016.02); *H02P 6/10* (2013.01); *H02P 21/05* (2013.01)

(58) Field of Classification Search
CPC ..... H02P 21/005; H02P 23/004; H02P 27/12; H02P 21/0042; H02P 21/0046; H02P 21/06; H02P 21/08; H02P 21/10; H02P 21/12; H02P 21/141; H02P 21/00
USPC .................................................... 318/400.07
See application file for complete search history.

(56) References Cited

U.S. PATENT DOCUMENTS

| 4,724,373 | A  * | 2/1988 | Lipo ...................... H02P 21/00 318/798 |
| 7,739,005 | B1 * | 6/2010 | Tang ......................... B60L 3/10 701/22 |
| 2008/0084716 | A1 * | 4/2008 | Ganev ..................... H02M 1/14 363/39 |
| 2012/0068641 | A1 * | 3/2012 | Imura ..................... H02P 21/13 318/400.02 |
| 2015/0180399 | A1 * | 6/2015 | Ahmad ................. H02P 25/088 318/701 |

FOREIGN PATENT DOCUMENTS

WO    WO 2014087640 A1 *  6/2014  ............ H02P 25/088

* cited by examiner

*Primary Examiner* — Eduardo Colon Santana
*Assistant Examiner* — Bickey Dhakal
(74) *Attorney, Agent, or Firm* — Patent Law Office of David G. Beck (57) ABSTRACT

An AC motor controller is provided that utilizes a direct torque controller and primary and secondary control loops. The primary control loop operates in a relatively conventional manner, determining a voltage vector that sets the inverter switching variables for the motor's power inverter, where the voltage vector is based on the motor's torque and flux as estimated from the measured voltage and current of the motor. The secondary loop, utilizing a faster sampling rate than the primary loop, estimates a more up-to-date torque error which is compared to a secondary torque error band, where the secondary torque error band is preferably narrower that the primary torque error band. If the secondary loop determines that the up-to-date torque error has exceeded the secondary torque error band, it sets a null voltage vector, thereby limiting torque ripples.

13 Claims, 6 Drawing Sheets

| $d_\Psi$ | $d_T$ | S1 | S2 | S3 | S4 | S5 | S6 |
|---|---|---|---|---|---|---|---|
| | 1 | $V_2$ | $V_3$ | $V_4$ | $V_5$ | $V_6$ | $V_1$ |
| 1 | 0 | $V_0$ | $V_7$ | $V_0$ | $V_7$ | $V_0$ | $V_7$ |
| | -1 | $V_6$ | $V_1$ | $V_2$ | $V_3$ | $V_4$ | $V_5$ |
| | 1 | $V_3$ | $V_4$ | $V_5$ | $V_6$ | $V_1$ | $V_2$ |
| 0 | 0 | $V_7$ | $V_0$ | $V_7$ | $V_0$ | $V_7$ | $V_0$ |
| | -1 | $V_5$ | $V_6$ | $V_1$ | $V_2$ | $V_3$ | $V_4$ |

DIRECT TORQUE CONTROL MOTOR CONTROLLER WITH TORQUE RIPPLE REDUCTION

FIELD OF THE INVENTION

The present invention relates generally to an electric motor and, more particularly, to a direct torque control motor controller for use with an AC electric motor.

BACKGROUND OF THE INVENTION

In response to the demands of consumers who are driven both by ever-escalating fuel prices and the dire consequences of global warming, the automobile industry is slowly starting to embrace the need for ultra-low emission, high efficiency cars. While some within the industry are attempting to achieve these goals by engineering more efficient internal combustion engines, others are incorporating hybrid or all-electric drive trains into their vehicle line-ups. To meet consumer expectations, however, the automobile industry must not only achieve a greener drive train, but must do so while maintaining reasonable levels of performance, range, reliability, and cost.

In recent years, electric vehicles have proven to be not only environmentally friendly, but also capable of meeting, if not exceeding, consumer desires and expectations regarding performance. While early electric vehicles used DC motors in order to achieve the variable levels of speed and torque required to drive a vehicle, the advent of modern motor control systems utilizing direct torque control have allowed AC motors to deliver the same level of performance while providing the many benefits associated with AC motors including small size, low cost, high reliability and low maintenance.

Although the prior art teaches a variety of direct torque control systems that may be used with an AC motor, these systems typically allow high, potentially harmful transient over currents that can damage the electrical system by causing the power switching semiconductor devices to exceed their operating limits. Transient over currents may occur whenever the flux and torque are rapidly ramped up from zero or during transient operation when the torque command changes rapidly. In addition to transient over currents, large torque ripples may occur during both transient operation and steady-state high torque operation. Torque ripples can shorten a motor system's life and have undesired consequences on the load such as mechanical vibrations and acoustic noise. Accordingly, what is needed is an AC motor control system that prevents the occurrence of high transient currents and limits torque ripples. The present invention provides such a control system.

SUMMARY OF THE INVENTION

The method of the present invention provides a means of controlling an AC motor, where the AC motor is coupled to a power inverter, the method comprising the steps of operating a primary control loop at a primary sampling frequency and operating a secondary control loop at a secondary sampling frequency, where the secondary sampling frequency is at least two times faster, and preferably at least four times faster, than the primary sampling frequency. The primary control loop is comprised of the steps of (i) estimating an instantaneous motor torque; (ii) estimating an instantaneous stator flux; (iii) determining a torque error based on the instantaneous motor torque and a reference motor torque; (iv) determining a flux error based on the instantaneous stator flux and a reference stator flux; (v) comparing the torque error to a primary torque error band; (vi) determining a torque error status; (vii) comparing the flux error to a primary flux error band; (viii) determining a flux error status; and (ix) selecting a voltage vector based on the torque error status and the flux status, where the voltage vector determines a set of inverter switching variables for the power inverter coupled to the AC motor. The secondary control loop is comprised of the steps of (i) estimating the torque error; (ii) comparing the torque error to a secondary torque error band; (iii) leaving the voltage vector selected by the primary control loop unchanged when the torque error does not exceed the secondary torque error band; and (iv) selecting a null voltage vector when the torque error exceeds the secondary torque error band. The method may further include the steps of (i) selecting a secondary upper torque limit for the secondary torque error band to be closer to the reference motor torque than the primary upper torque limit corresponding to the primary torque error band, and (ii) selecting a secondary lower torque limit for the secondary torque error band to be closer to the reference motor torque than the primary lower torque limit corresponding to the primary torque error band. The method may further include the steps of determining an applied stator voltage and measuring a stator current, where these steps are performed prior to estimating the instantaneous motor torque and instantaneous stator flux. The step of selecting a null voltage vector in the secondary control loop may further include the step of selecting between a first null voltage vector, $V_0$, and a second null voltage vector, $V_7$. Preferably the step of selecting between the first null voltage vector, $V_0$, and the second null voltage vector, $V_7$, is based on minimizing changes in a set of switching state variables for the power inverter. The step of selecting a null voltage vector in the secondary control loop may be performed without inclusion of a wait state. The method may further include the step of synchronizing the primary and secondary control loops.

In another aspect, an AC motor control system is provided that includes an AC motor controller configured to provide a set of inverter switching variables to a power inverter coupled to the AC motor. The AC motor controller is further configured to perform a first series of operations in conjunction with a primary control loop operating at a primary sampling frequency and a second series of operations in conjunction with a secondary control loop operating at a secondary sampling frequency, where the secondary sampling frequency is at least two times faster, and preferably four times faster, than the primary sampling frequency. In the first series of operations a voltage vector is selected, where the voltage vector determines the set of inverter switching variables and is based on a torque error relative to a primary torque error band and a flux error relative to a flux error band, where the voltage vector determines the set of inverter switching variables. In the second series of operations the voltage vector is set to a null voltage vector whenever a current torque error exceeds a secondary torque error band. Preferably the AC motor controller is configured to synchronize initiation of the second series of operations with initiation of the first series of operations. Preferably the secondary torque error band includes (i) a secondary upper torque limit that is closer to the reference motor torque than the primary upper torque limit of the primary torque error band, and (ii) a secondary lower torque limit that is closer to the reference motor torque than the primary lower torque limit of the primary torque error band. The AC motor controller may be configured to determine an applied stator voltage and measure a stator current, where the applied stator voltage and the stator current are used by the AC motor controller to estimate an instantaneous motor torque used to determine the torque error and to estimate an instantaneous stator flux used to determine the flux error. The AC motor controller may utilize a first device to perform the first series of operations in conjunction with the primary control loop, and a second device such as a field-programmable gate array (FPGA) or a complex programmable logic device (CPLD) to perform the second series of operations in conjunction with the secondary control loop.

A further understanding of the nature and advantages of the present invention may be realized by reference to the remaining portions of the specification and the drawings.

BRIEF DESCRIPTION OF THE DRAWINGS

It should be understood that the accompanying figures are only meant to illustrate, not limit, the scope of the invention and should not be considered to be to scale. Additionally, the same reference label on different figures should be understood to refer to the same component or a component of similar functionality.

DESCRIPTION OF THE SPECIFIC EMBODIMENTS

As used herein, the singular forms "a", "an" and "the" are intended to include the plural forms as well, unless the context clearly indicates otherwise. The terms "comprises", "comprising", "includes", and/or "including", as used herein, specify the presence of stated features, process steps, operations, elements, and/or components, but do not preclude the presence or addition of one or more other features, process steps, operations, elements, components, and/or groups thereof. As used herein, the term "and/or" and the symbol "/" are meant to include any and all combinations of one or more of the associated listed items. Additionally, while the terms first, second, etc. may be used herein to describe various steps, calculations, or components, these steps, calculations, or components should not be limited by these terms, rather these terms are only used to distinguish one step, calculation, or component from another. For example, a first calculation could be termed a second calculation, and, similarly, a first step could be termed a second step, and, similarly, a first component could be termed a second component, without departing from the scope of this disclosure.

Figure 1:
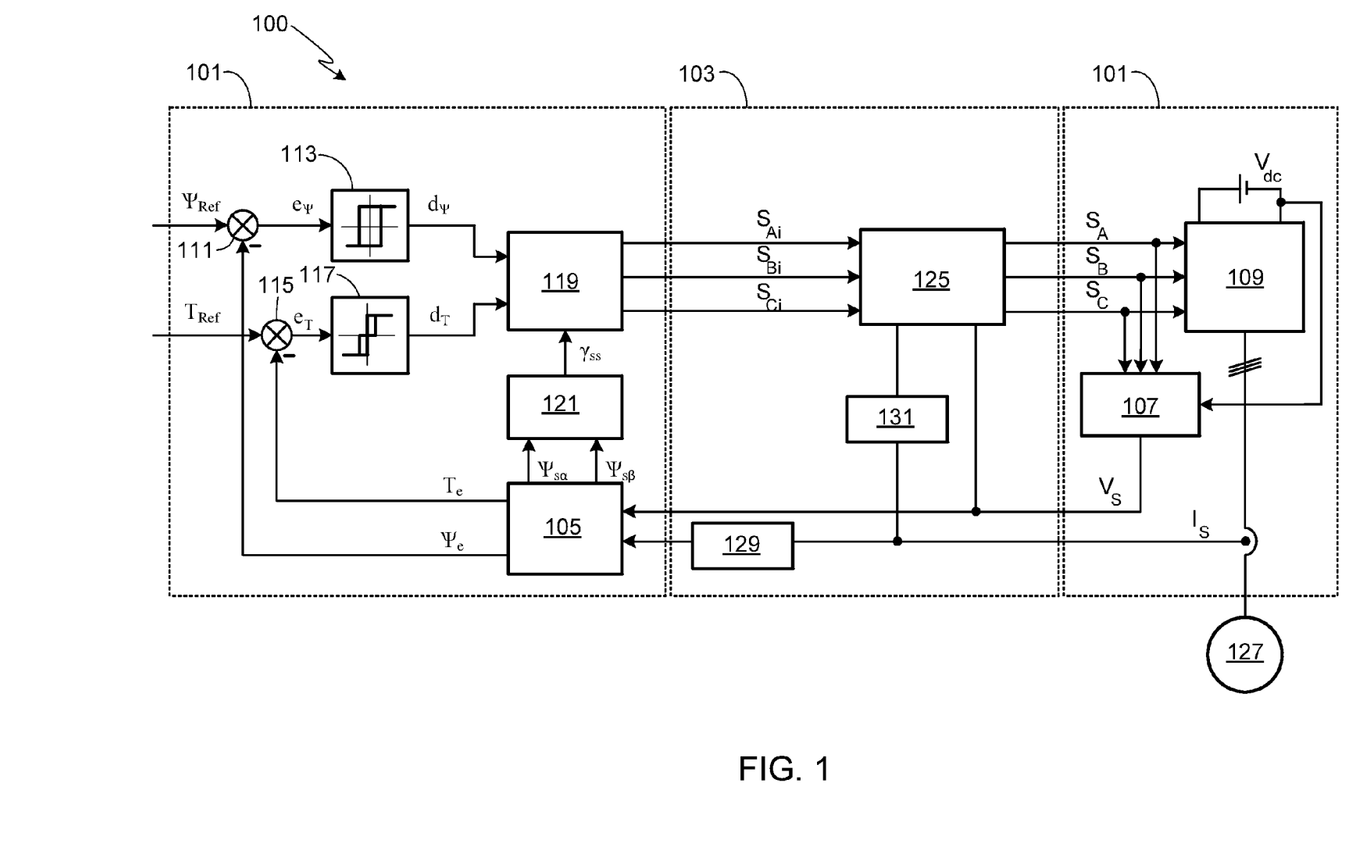
FIG. 1 provides a schematic diagram of the direct torque control system of the invention.

FIG. 1 illustrates a control system 100 in accordance with the invention. Portions 101 of control system 100 are known by those of skill in the art as they constitute a direct torque controller in accordance with the prior art. Portion 103, added to control system 100, provides the improvement of the invention. As portions 101 are well known, only a brief discussion of those aspects of the motor controller is contained herein.

In control system 100, the electromagnetic flux and torque are independently controlled and optimized in order to keep the stator flux linkage and torque errors within the flux and torque hysteresis bands. A flux and torque estimator 105 estimates instantaneous stator flux, $\Psi_e$, and motor output torque, $T_e$, during each sampling period based on the previously applied stator voltage, $V_s$, and the measured stator current, $I_s$. The stator voltage, $V_s$, is synthesized by voltage synthesizer 107 based on inverter switching variables $S_A$, $S_B$ and $S_C$, along with the measured dc-link voltage $V_{dc}$. The stator current, $I_s$, is obtained from the 3-phase voltage source inverter 109.

The estimated instantaneous stator flux, $\Psi_e$, and a reference stator flux, $\Psi_{Ref}$, are compared at 111 to determine an estimated flux error, $e_\Psi$. The estimated flux error, $e_\Psi$, is fed into a flux hysteresis comparator 113 which determines a flux error status, $d_\Psi$. Flux hysteresis comparator 113 is a two-level controller, i.e., it can yield either a 0 or 1.

The estimated output torque, $T_e$, and a reference torque, $T_{Ref}$, are compared at 115 to determine an estimated torque error, $e_T$. The estimated torque error, $e_T$, is fed into a torque hysteresis comparator 117 which determines a torque error status, $d_T$. Torque hysteresis comparator 117 is a three-level controller, i.e., it can yield a value of 1, −1 or 0, depending upon whether the torque is to be increased, decreased or remain unchanged.

The output from the flux hysteresis comparator 113 and the output from the torque hysteresis comparator 117 are fed into a vector selection table 119, along with the spatial sector, $\gamma_{ss}$, in which the stator flux is lying at the time of calculation. The value for $\gamma_{ss}$ is provided by the sector evaluator 121 which calculates the position of the stator flux in $\alpha\beta$ coordinates in a plane where the plane is divided into six sectors corresponding to the voltage vectors applied by inverter 109. The position of the stator flux is determined by comparing the magnitude to the projection components in axes $\alpha$ and $\beta$. The vector selection table 119 sets the initial values for the inverter switching variables, referred to herein as $S_{Ai}$, $S_{Bi}$ and $S_{Ci}$, required to drive the error in the torque and flux to zero.

When switching variables $S_{Ai}$, $S_{Bi}$ and $S_{Ci}$ are fed directly into inverter 109 and used to produce the desired torque in motor 127, as is the case in a conventional DTC controller, torque ripples are typically observed, along with a varied and uncontrolled switching frequency. Furthermore, since a conventional DTC controller does not provide current loop feedback control, overcurrent may occur, especially in low inductance motors. To overcome these issues, and in accordance with the invention, a pulse-width-modulation (PWM) controller 125 is added into the circuit as shown in FIG. 1. PWM controller 125 modifies switching variables $S_{Ai}$, $S_{Bi}$ and $S_{Ci}$ to yield switching variables $S_A$, $S_B$ and $S_C$ which, in turn, are fed into the 3-phase voltage source inverter 109. Motor 127 is connected to inverter 109.

In a conventional DTC system, i.e., a DTC controller that does not include PWM 125, torque ripple results from torque overshoot and undershoot that arises due to the abrupt switching from one selected voltage vector to another, subsequently selected voltage vector. Additionally, there is a delay between the time that the switching variables are sampled and the time that the vectors are selected by vector selection table 119 and are fed into the source inverter 109, which may extend the magnitude of the torque ripples as well as prolong their duration. In order to manage torque ripple in such a system, the designer must carefully balance the need for fine motor control, which requires that the torque hysteresis band be relatively narrow, versus the need to keep the switching frequency low enough to maintain the power devices well within their desired thermal operating range. Unfortunately, in order to decrease the torque ripples, in a conventional DTC system the motor controller sampling rate is increased in conjunction with an increase in switching frequency, resulting in a reduction in the number of instruction codes that may be executed within the motor controller main interrupt loop.

Figure 2:
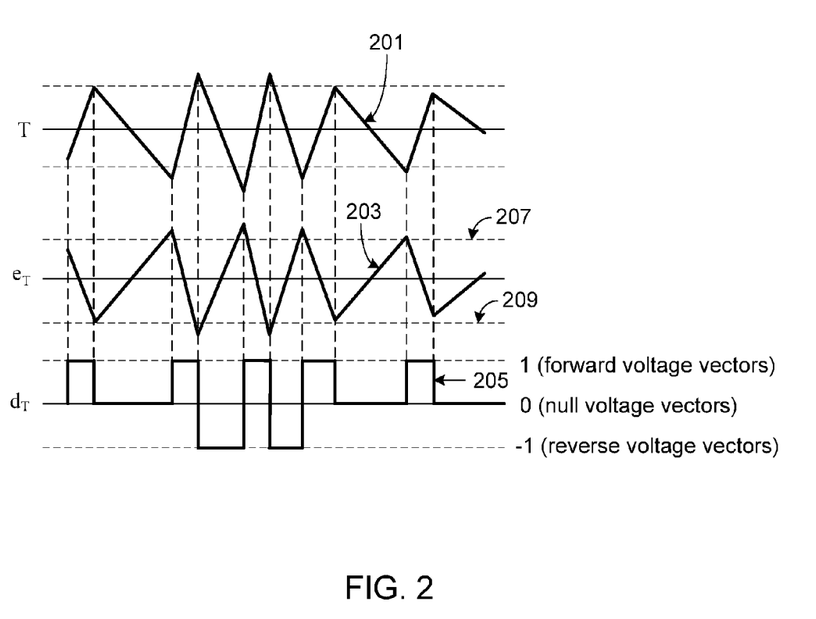
FIG. 2 illustrates an exemplary torque oscillation waveform of the torque control branch of a prior art, conventional direct torque control system.

FIG. 2 illustrates the torque ripple and variable switching frequency in a conventional DTC system and, more specifically, shows the interplay between torque 201 (T), torque error 203 ($e_T$) and torque error status 205 ($d_T$). As shown, a change in the voltage vector occurs whenever the torque error reaches either the upper torque error limit 207 or the lower torque error limit 209. Since the time it takes for the torque error to reach either limit depends on the slope of the torque, which varies with system operating conditions, the switching frequency varies as well, i.e., the switching frequency in a conventional DTC system is variable. Note that if the band used for flux hysteresis comparator 113 is too small, or the sampling period is too large, the torque overshoot may touch the upper band. If this occurs, the torque error status 205 will be switched to −1 and a reverse voltage vector will be selected. The reverse voltage vector causes the torque to be reduced rapidly, thereby causing undershoot.

In addition to the issue of torque ripple control in a conventional DTC system, inverter 109 transient over currents may also occur which exceed the current handling capabilities of the inverter switching power semiconductor devices and may potentially damage various motor drive system components. Such transient over currents may arise during motor start-up or when there are steep changes in either the torque or flux commands.

In order to overcome the limitations of a conventional DTC, the present invention uses a PWM 125 to modify the initial inverter switching variables $S_{Ai}$, $S_{Bi}$ and $S_{Ci}$ to yield switching variables $S_A$, $S_B$ and $S_C$. The sampling frequency of PWM 125, set by A/D converter 131, is at least two times faster, and more preferably at least four times faster, than primary A/D converter 129, where both A/D converters 129/131 convert the measured analog stator current, $I_s$, to a digital signal. PWM 125 imposes a suitable duty cycle that affects the trailing edge of the selected voltage vector, thereby decreasing torque ripple without increasing the primary sampling frequency associated with the primary DTC control loop.

It will be appreciated that due to the faster sampling rate used by A/D converter 131, preferably A/D converter 131 along with PWM 125 reside on an IC (e.g., an FPGA or CPLD) that is separate from the IC containing the primary elements of the DTC controller.

Figure 3:
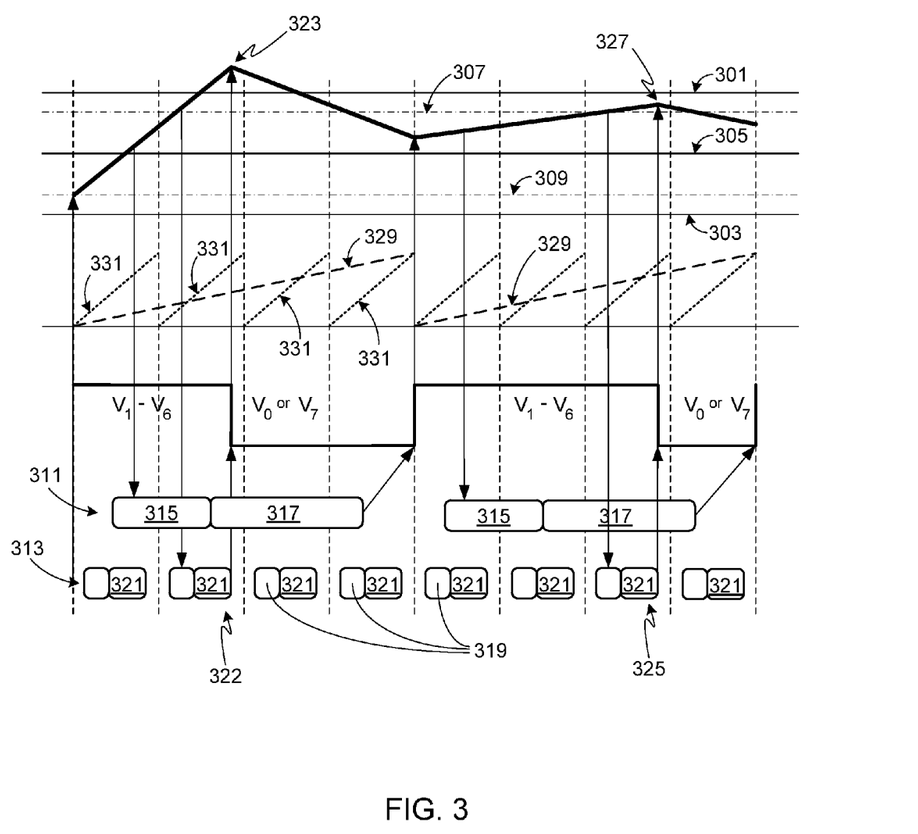
FIG. 3 illustrates an exemplary torque oscillation waveform with reduced torque ripples using the torque ripple limiting method of the invention.
Figure 4:
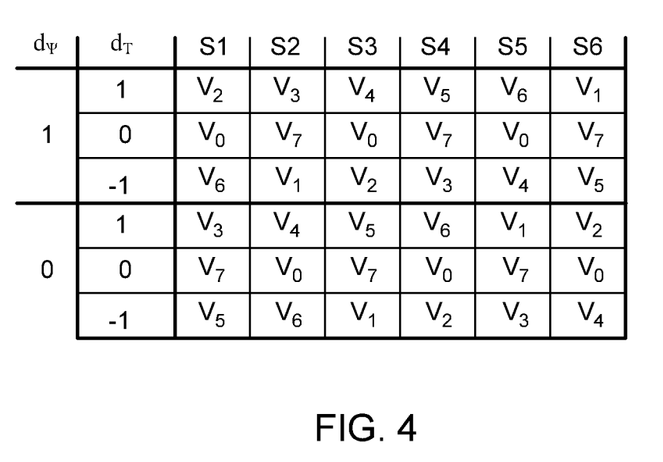
FIG. 4 provides a switching table applicable to the torque ripple limiting method described relative to FIG. 3.

FIG. 3 illustrates an exemplary torque oscillation waveform with reduced torque ripples using the torque ripple limiting method of a preferred embodiment of the invention. The primary upper limit 301, the primary lower limit 303 and the torque reference 305 are similar to those used in a conventional DTC system where limits 301 and 303 form a hysteresis band. A new voltage vector is selected whenever the estimated torque exceeds either upper limit 301 or lower limit 303, or when the torque error goes outside of the band, where the torque error is the difference between the estimated torque and torque reference. Vector selection table 119, using the switching table shown in FIG. 4, selects the appropriate voltage vector based on the flux error status, $d_\psi$, and the torque error status, $d_T$. As shown in the vector switching table of FIG. 4, when the torque error is within the window (i.e., when $d_T$ is equal to 0), one of the null (i.e., 0) voltage vectors $V_0$ or $V_7$ is selected. The selection of a null vector results in minimal or no movement of torque variation. It will be appreciated that in practice, when $V_0$ or $V_7$ is selected, due to the nature of the motor electrical characteristics the motor torque will naturally drop slightly. Selecting the other voltage vectors, i.e., $V_1$-$V_6$, as a result of the torque error and flux error will cause the torque to increase or decrease to a greater extent.

In the conventional DTC system, the selected voltage vector is in effect until the next band is reached. As previously described and as is known by those of skill in the art, the band needs to be wide enough to avoid a high switching frequency and a high control loop sampling rate. Unfortunately the use of a wide band leads to high torque ripples. Accordingly, the present embodiment inserts a suitable duty cycle to the selected and applied voltage vector, so that potentially the vector is in effect for a shorter period of time. Additionally, rather than waiting for the torque hysteresis band to be exceeded to select the next voltage vector, a fixed switching frequency is used.

In the illustrated embodiment, the most recent estimated torque is compared to a secondary, narrower torque error band defined by upper limit 307 and lower limit 309. The most recent estimated torque is computed in the PWM modifier 125 with inputs from the faster A/D current sampler 131 and from the voltage sensor 107. Since the PWM modifier 125 is running at a faster rate compared to the main control loop (for example, 4 times faster as illustrated in FIG. 3), the most recent torque error can be computed. This updated torque error is then compared to the narrower torque error band, i.e., as defined by secondary upper limit 307 and secondary lower limit 309, in the PWM modifier 125 and used to stop the selected voltage vector. It should be understood that the secondary lower torque limit 309 is optional, as its removal can still result in reduced torque ripple, albeit to a lesser extent, while limiting the maximum phase current.

When PWM modifier 125 determines that the selected voltage vector $V_1$-$V_6$ is to end, i.e., when the torque ripples exceed the secondary, narrower torque error band defined in this example by limits 307 and 309, a null voltage vector $V_0$ or $V_7$ is selected. In order to determine which of the two null voltage vectors is selected, the system selects the null voltage vector that will require the fewest number of switching state changes for the 6 power semiconductor devices comprising source inverter 109. It should be understood that each voltage vector $V_1$-$V_6$ corresponds to a distinct switching device state combination.

Also visible in FIG. 3 is the primary loop timing sequence 311 and the secondary loop timing sequence 313 as well as the relative durations of each for the exemplary configuration. In the primary loop timing sequence 311, the key steps of ADC (315) and compute (317) are shown, while the same steps, labeled 319 (ADC) and 321 (compute) are shown for the secondary loop timing sequence 313. During the ADC steps (steps 315 and 319) the data from the system is acquired and digitized, e.g., the analog stator current, $I_s$, and the stator voltage, $V_s$. During the primary loop computing steps 317 the system (i) estimates instantaneous stator flux and motor output torque; (ii) determines estimated flux and torque errors; (iii) determines flux and torque status; (iv) determines the appropriate voltage vector; and (v) sets the inverter switching variables. During the secondary loop computing steps 321 the system (i) estimates an up-to-date torque error; (ii) compares the up-to-date torque error with a secondary torque error band; and (iii) sets a null voltage vector when the torque error exceeds the secondary, narrower torque error band.

As described above, the secondary loop timing runs at least two times faster than that of the primary loop timing sequence. In the illustrated embodiment shown in FIG. 3, the secondary loop runs four times faster than the primary loop. The trailing edge decision can be made by any of the secondary loops and the execution to change the voltage vector from $V_1$-$V_6$ to either $V_0$ or $V_7$ is preferably without a wait state. In FIG. 3, it is shown that during the first primary loop, the second secondary loop operation (labeled "322") results in a change in the voltage vector. Note the change in torque, labeled "323", due to operation of the secondary loop. Similarly, during the second primary loop, the third secondary loop operation (labeled "325") changes the voltage vector, resulting in the torque change labeled "327". Note that the primary loop still determines the next voltage vector, and the next voltage vector may be applied at the beginning of the next switching period.

As described above and shown in FIG. 3, in the illustrated embodiment PWM modifier 125 enforces a duty cycle for the selected voltage vector when necessary, i.e., when the torque ripples exceed the secondary torque error band. As long as the torque ripples do not exceed the secondary torque error band, the selected voltage vector will be applied throughout the sampling period. The duty cycle is a result of the added trailing edge of the selected and applied voltage vector. The PWM modifier 125 enforces the trailing edge.

Also visible in FIG. 3 is the microprocessor implemented primary loop counter 329 and secondary loop counter 331. As previously noted, in this exemplary configuration four secondary loop cycles run for each primary loop cycle. Synchronization of the primary and secondary loops by any of several methods, such as using a common CPU clock, or using the PWM edge of the incoming PWM signals $S_{Ai}$ to start the clock of the first of the four secondary loop cycles.

It should be understood that there is still a delay between the secondary current sampling and the action to switch the voltage vector in order to bring down the torque excursions. During this short delay, a torque excursion will typically continue to increase beyond the already narrower secondary torque error band, such excursions are shown in FIG. 3. However, as the secondary loop is implemented in a fast FPGA or CPLD, and without much additional computational burden other than for torque estimation, the delay can be designed to be very small, resulting in only small torque excursions between the sampling instant and the control response instant.

In summary, the preferred embodiment illustrated in FIG. 3 utilizes a secondary loop, implemented by PWM 125, to estimate a more up-to-date torque error which is compared to a secondary torque error band that is preferably narrower that the primary torque error band. As a result, torque ripples are limited while the main control loop operates with a constant sampling frequency and a constant switching frequency. In comparison, to achieve a similar range of torque ripples in a conventional DTC controller, it is necessary to use a faster main loop sampling rate, which limits the amount of computing that can be accommodated, and an uncontrolled, variable and faster switching frequency, which may result in higher inverter losses as well as make it difficult to manage both vibration and acoustic noises.

Figure 5:
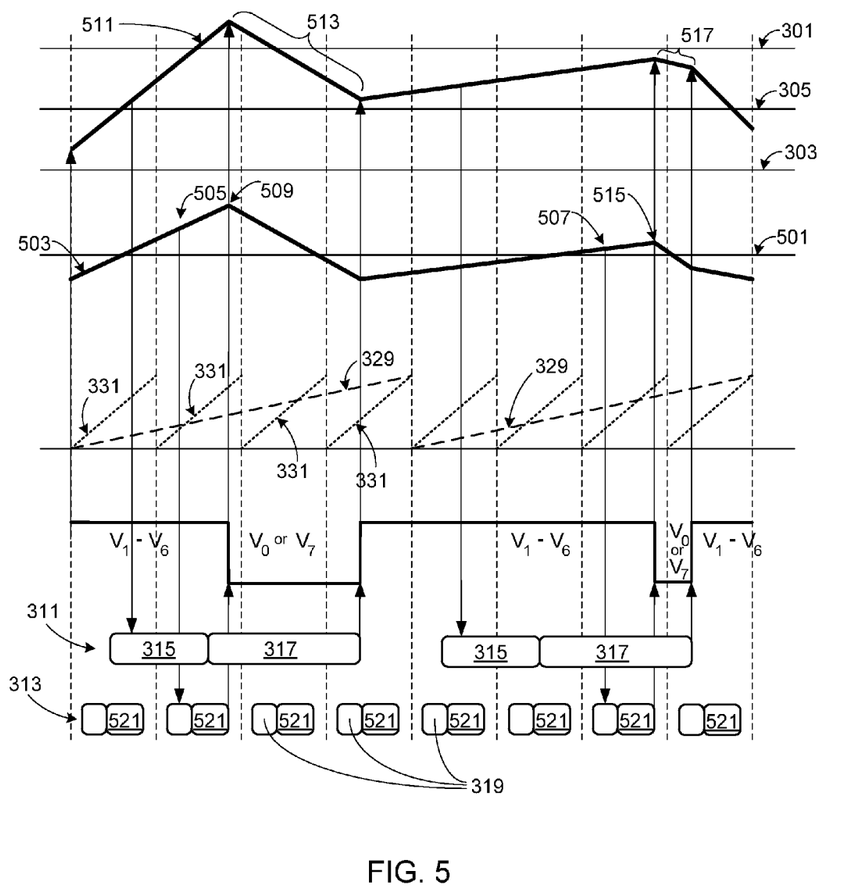
FIG. 5 illustrates an exemplary torque oscillation waveform with reduced torque ripples using an alternate method of the invention, specifically using current limiting and a variable switching period.

FIG. 5 illustrates a second preferred embodiment which is designed to address the issue of high transient current which may occur during start up, i.e., when the flux and torque ramp up from zero. In a conventional DTC motor drive control system, high transient or over currents may also occur during normal dynamic or steady-state operations since the motor phase current is not directly controlled by a current regulator such as that present in a typical field orientation controlled motor drive. For a low inductance AC electric motor, such as those often used in both all-electric and hybrid vehicles, the current ripples due to power semiconductor switching operation can be high, making the effects of transient over current worse. A result of transient over current is that the power switching device current handling capability may be exceeded resulting in inverter damage, or excessive EMI may be generated that can affect the performance of the inverter or other nearby electronic components.

In operation, the embodiment illustrated in FIG. 5 is quite similar to the embodiment of FIG. 3, with some notable differences. Specifically, the embodiment of FIG. 5 does not include a secondary torque error band (defined by limits 307 and 309 in the embodiment shown in FIG. 3), rather this embodiment only uses the torque error band associated with the main control loop. This embodiment does, however, limit motor phase current, thereby limiting transient over currents. By limiting transient over currents, torque ripples are also limited, especially when the torque reference is set to a relatively high value or when the torque reference or the flux reference changes rapidly. In an electric or hybrid vehicle, the torque reference may change rapidly under hard acceleration or hard braking, while the flux reference may change rapidly when the motor starts up from an initial unexcited state.

In this embodiment, during the secondary loop's computing steps (step 521 in FIG. 5) PWM modifier 125 (i) compares measured phase currents (e.g., 2 phases for a 3 phase AC induction machine or a 3 phase permanent magnet AC machine) to current limit 501; and (ii) applies a null voltage vector ($V_0$ or $V_7$) to the remainder of the primary control period when limit 501 is reached or exceeded. As in the prior embodiment, in order to determine which of the two null voltage vectors is selected, the system selects the null voltage vector that will require the fewest number of switching state changes for the power semiconductor devices comprising source inverter 109. Current limit 501 can be a fixed limit based on the capabilities of inverter or motor hardware capability, or can be a variable limit based on operating conditions such as inverter or motor temperature or other conditions.

While the secondary loop timing runs at least two times faster than the primary loop, in this embodiment, as with the embodiment shown in FIG. 3, the secondary loop runs four times faster than the primary loop. The trailing edge decision can be made by any of the secondary loops. In FIG. 5, current limit 501 is exceeded twice, resulting in PWM 125 applying a null vector twice. The first occurrence, which is during the first primary loop cycle, is due to operation of the second secondary loop and occurs when the measured phase current 503 exceeds the current limit 501 (labeled "505" on the measured phase current). The second occurrence, which is during the second primary loop cycle, is due to operation of the third secondary loop and occurs when the measured phase current 503 exceeds the current limit 501 (labeled "507" on the measured phase current). As in the prior embodiment, the primary loop still determines the next voltage vector.

Figure 6:
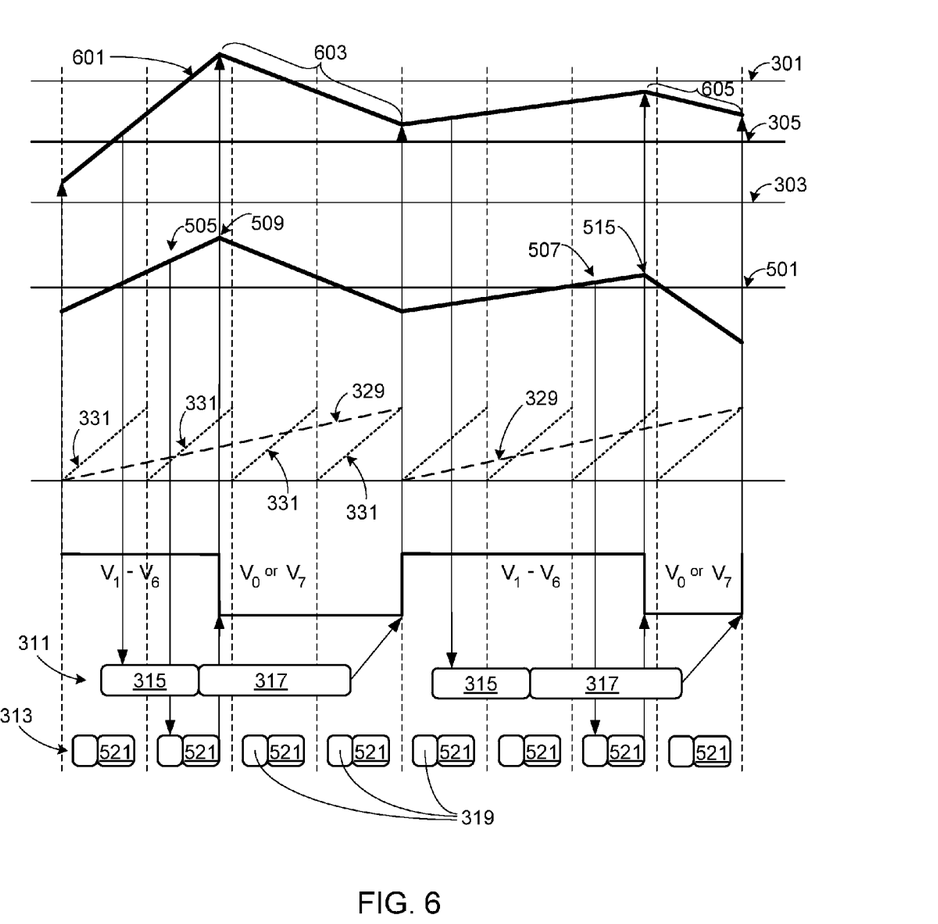
FIG. 6 illustrates an exemplary torque oscillation waveform with reduced torque ripples using an alternate method of the invention, specifically using current limiting and a constant switching period.

FIG. 6 illustrates a third preferred embodiment that is based on the second preferred embodiment shown in FIG. 5. The primary difference is the timing associated with voltage vector selection in the main control loop, also referred to herein as the primary control loop. In the second preferred embodiment the next voltage vector is selected at the completion of the primary loop voltage vector computation, while in the third preferred embodiment the next voltage vector is selected at the beginning of the next primary loop cycle. While the third embodiment, like the second embodiment, limits over current and reduces torque ripples without increasing main control loop sampling frequency and switching frequency, due to the timing differences between these two embodiments, each offers distinct advantages.

In general, the secondary loop in the third preferred embodiment works in the same way as in the second preferred embodiment. Specifically, PWM modifier 125 compares measured phase currents to current limit 501 and when limit 501 is reached or exceeded, a null voltage vector ($V_0$ or $V_7$) is executed immediately without delay, thereby limiting the transient current and its harmful effects. The selection between the two null voltage vectors is based on minimizing the number of switching state changes required by the change from the prior voltage vector to the null voltage vector.

The torque curves shown in FIGS. 5 and 6 help to clarify the distinctions between the second and third embodiments which are the result of the voltage selection step in the main control loop. Comparing these two figures, note that after the secondary loop selects a null voltage vector at 509 due to the current exceeding the current limit 501 during the second secondary loop (labeled "505"), the effect of the selected null voltage vector on torque curve 511 (see portion 513 of torque curve 511 of the second embodiment) is of a much shorter duration than the effect of the same selected null voltage vector on torque curve 601 (see portion 603 of torque curve 601 of the third embodiment). Similarly, after the secondary loop selects a null voltage vector at 515 due to the current exceeding the current limit 501 during the third secondary loop (labeled "507") of the next cycle, the effect of the selected null voltage vector on torque curve 511 (see portion 517 of torque curve 511 of the second embodiment) is of a much shorter duration than the effect of the same selected null voltage vector on torque curve 601 (see portion 605 of torque curve 601 of the third embodiment). Note that the shorter duration of the inserted null voltage vectors in the second embodiment provides better controllability of the torque, specifically allowing the torque curve to more closely follow the torque reference, potentially leading to reduced torque ripples and faster dynamic response.

In addition to differences in the duration of the null voltage vectors inserted by the secondary loop to limit the transient over current, it will be appreciated that the second embodiment typically results in a variable switching period while the third embodiment results in a constant switching period. As such, an advantage of the third embodiment over the second embodiment is that the constant switching period or switching frequency simplifies system optimization. In both methods, over current is limited and torque ripples are reduced, as compared to the conventional DTC, without increasing main control loop sampling frequency and switching frequency.

While there are some minor differences between the second and third embodiments as noted above, it will be appreciated that the computational requirements of the secondary loop are much simpler, and therefore can be completed much more quickly, in either of these embodiments as compared to the first embodiment since the first embodiment requires the torque to be estimated and compared to a secondary torque error band. Rather, in the second and third embodiments the main computing is to perform potential signal processing such as digital filtering, comparison to a constant or variable current limit, and then selection of one of the null voltage vectors. Furthermore, the secondary loop of the second and third embodiments may be implemented without obtaining voltage information from the voltage sensor 107, further simplifying the computational needs of these embodiments.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. A method of controlling an AC motor, wherein said AC motor is coupled to a power inverter, the method comprising the steps of:
    estimating an instantaneous output torque at a primary sampling frequency;
    estimating an instantaneous stator flux at said primary sampling frequency;
    comparing said instantaneous output torque and a reference torque to determine an estimated torque error;
    providing said estimated torque error to a torque hysteresis comparator, wherein said torque hysteresis comparator outputs a torque error status based on whether the estimated torque error falls within a primary torque error band or exceeds either a primary upper torque error limit or a primary lower torque error limit, wherein said primary upper torque error limit and said primary lower torque error limit correspond to said primary torque error band;
    comparing said instantaneous stator flux and a reference stator flux to determine an estimated flux error;
    providing said estimated flux error to a flux hysteresis comparator, wherein said flux hysteresis comparator outputs a flux error status; and
    selecting and applying a voltage vector based on said torque error status and said flux error status, wherein said voltage vector determines a set of inverter switching variables for said power inverter coupled to said AC motor; and
    estimating an updated output torque at a secondary sampling frequency, wherein said secondary sampling frequency is at least two times faster than said primary sampling frequency;
    comparing said updated output torque and said reference torque to determine an updated torque error;
    providing said updated torque error to a pulse-width-modulation (PWM) controller, wherein said PWM controller compares said updated torque error to a secondary torque error band, wherein said secondary torque error band is narrower than said primary torque error band, and wherein a secondary upper torque error limit corresponding to said secondary torque error band is selected to be closer to said reference torque than said primary upper torque error limit corresponding to said primary torque error band;
    leaving said voltage vector selected based on said torque error status and said flux error status unchanged when said updated torque error does not exceed said secondary torque error band; and
    selecting a null voltage vector when said updated torque error exceeds said secondary torque error band.

2. The method of claim 1, further comprising the step of selecting said secondary sampling frequency to be at least four times faster than said primary sampling frequency.

3. The method of claim 1, further comprising the step of selecting a secondary lower torque error limit corresponding to said secondary torque error band to be closer to said reference motor torque than said primary lower torque error limit corresponding to said primary torque error band.

4. The method of claim 1, wherein prior to said steps of estimating said instantaneous output torque and said instantaneous stator flux said method further comprises the steps of determining an applied stator voltage and measuring a stator current.

5. The method of claim 1, wherein said step of selecting said null voltage vector further comprises the step of selecting between a first null voltage vector, $V_0$, and a second null voltage vector, $V_7$.

6. The method of claim 5, wherein said step of selecting between said first null voltage vector, $V_0$, and said second null voltage vector, $V_7$, is based on minimizing changes in a set of switching state variables for said power inverter.

7. The method of claim 1, further comprising the step of synchronizing a primary cycle counter corresponding to said primary sampling frequency with a secondary cycle counter corresponding to said secondary sampling frequency.

8. A control system coupled to an AC motor via a power inverter, comprising:
   a primary A/D converter, wherein said primary A/D converter converts a measured analog stator current to a first digital stator current at a primary sampling frequency;
   a flux and torque estimator coupled to a voltage sensor and to said primary A/D converter, wherein said flux and torque estimator outputs an estimated stator flux and an estimated output torque;
   a flux error estimator, said flux error estimator comparing said estimated stator flux and a reference stator flux and outputting an estimated flux error;
   a torque error estimator, said torque error estimator comparing said estimated output torque and a reference torque and outputting an estimated torque error;
   a flux hysteresis comparator coupled to said flux error estimator, said flux hysteresis comparator outputting a flux error status;
   a torque hysteresis comparator coupled to said torque error estimator, said torque hysteresis comparator outputting a torque error status based on said estimated torque error relative to a primary torque error band;
   a sector evaluator outputting a spatial sector;
   a first device containing a vector selection table, wherein said first device is coupled to said flux hysteresis comparator and to said torque hysteresis comparator and to said sector evaluator, wherein said first device outputs a voltage vector based on said torque error status and said flux error status, wherein said voltage vector determines a set of inverter switching variables;
   a secondary A/D converter, wherein said secondary A/D converter converts said measured analog stator current to a second digital stator current at a secondary sampling frequency, wherein said secondary sampling frequency is at least two times faster than said primary sampling frequency;
   a pulse-width-modulation (PWM) controller coupled to said first device and to said secondary A/D converter and to said voltage sensor and to said power inverter, wherein said PWM controller estimates an updated output torque at said secondary sampling frequency and determines an updated torque error based on said updated output torque and said reference torque, wherein said PWM controller compares said updated torque error to a secondary torque error band, wherein said secondary torque error band is narrower than said primary torque error band, and wherein a secondary upper torque error limit corresponding to said secondary torque error band is selected to be closer to said reference torque than a primary upper torque error limit corresponding to said primary torque error band, and wherein said PWM controller sets said voltage vector to a null voltage vector whenever said updated torque error exceeds said secondary torque error band.

9. The control system of claim 8, wherein said control system is configured to synchronize a secondary cycle counter corresponding to said second sampling frequency with a primary cycle counter corresponding to said primary sampling frequency.

10. The control system of claim 8, wherein said secondary sampling frequency is four times faster than said primary sampling frequency.

11. The control system of claim 8, wherein a secondary lower torque error limit corresponding to said secondary torque error band is closer to said reference motor torque than a primary lower torque error limit corresponding to said primary torque error band.

12. The control system of claim 8, wherein said PWM controller is comprised of a field-programmable gate array (FPGA).

13. The control system of claim 8, wherein said PWM controller is comprised of a complex programmable logic device (CPLD).

* * * * *